A. J. KIRSTIN.
STUMP PULLER.
APPLICATION FILED MAR. 30, 1914.
1,168,007.
Patented Jan. 11, 1916.
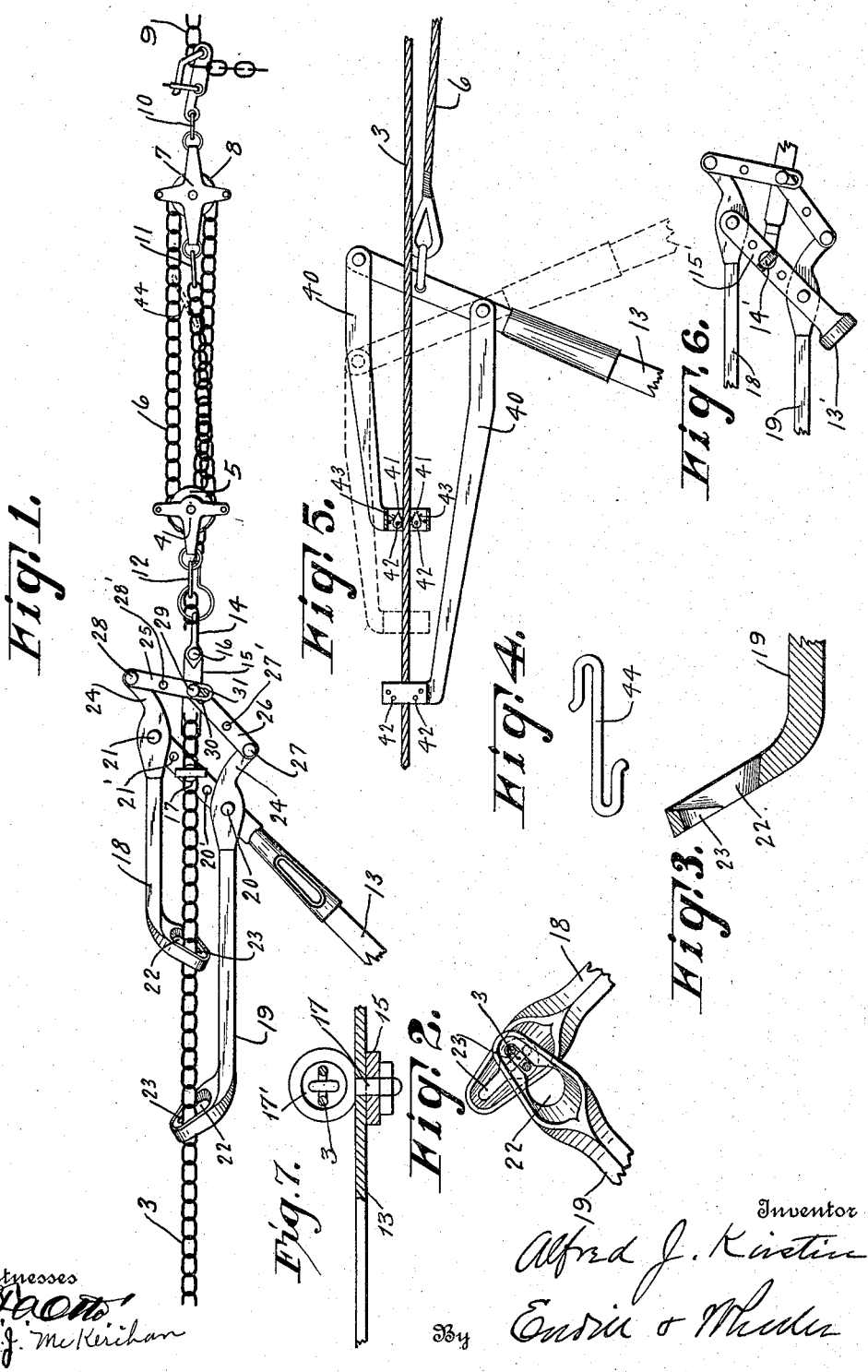

UNITED STATES PATENT OFFICE.

ALFRED J. KIRSTIN, OF ESCANABA, MICHIGAN.

STUMP-PULLER.

1,168,007.

Specification of Letters Patent. Patented Jan. 11, 1916.

Application filed March 30, 1914. Serial No. 828,226.

*To all whom it may concern:*

Be it known that I, ALFRED J. KIRSTIN, a citizen of the United States, residing at Escanaba, county of Delta, and State of Michigan, have invented new and useful Improvements in Stump-Pullers, of which the following is a specification.

My invention relates to improvements in stump pullers and it pertains, more especially, to that class by which a stump, an automobile or other object to be pulled, is anchored through a cable to a tree, stump or other immovable object, whereby the pull upon the stump or other object is effected by a reciprocating movement of the free end of a lever applied through said cable either directly or through said cable and one or more tackle blocks.

My invention is further explained by reference to the accompanying drawings in which—

Figure 1 is a plan view of my system of devices as adapted to be connected with a stationary and movable object. Fig. 2 is an end view of the grip mechanism. Fig. 3 is a longitudinal section of one of the grip dogs. Fig. 4 is a plan view of an S hook which is adapted to be used as indicated by dotted lines in Fig. 1. Fig. 5 represents a plan view of a modified grip mechanism in connection with a wire cable. Fig. 6 shows a modified form of device for temporarily connecting the operating lever with the grip dogs, and Fig. 7 is a detail showing the mechanism for connecting the bolt 17 with the operating lever and cable.

Like parts are identified by the same reference numerals throughout the several views.

While either a chain or a wire cable may be used with my operative mechanism, as shown in Figs. 1 and 5, for brevity of description I have here referred to both of said parts as a cable. One end of the cable may be connected with a stump or other object to be pulled, while the opposite end of the cable may be connected with an immovable object to which the movable object is anchored through the cable 3, tackle block 4, pulley 5, cable 6, tackle block 7, pulley 8, cable 9 and clevises 10, 11, 12 and 14. It will be understood, however, that in pulling small stumps or other light objects where tackle blocks and pulleys are unnecessary, the cable 6 may be connected with the cable 9 direct and the pulleys 5 and 8 and blocks 4 and 7 dispensed with. However, for all ordinary purposes we preferably employ the tackle blocks and pulleys as shown, whereby the power of the lever 13 applied to the object to be pulled may be multiplied according to the number of pulleys thus employed.

The draft upon the cable 6 is produced by the reciprocating movement of the free end of the lever 13. Said lever is pivotally connected to one end of the cable 6 through the clevis 14, link 15 and pivotal bolts 16 and 17. The bolt 17 is an eye bolt and the head of the same is provided with an aperture 17', shown in Fig. 7 of the drawings, for the reception of the chain 3 which passes through the same, as shown in said figure. The lever 13 is also pivotally connected with said bolt 17 and one end of the link 15 is provided with an aperture for the reception of said bolt, whereby it is obvious that the link 15 together with the parts connected therewith will be drawn rearwardly or toward the left, reference being had to Fig. 1 of the drawings, as said lever 13 is being operated when said eye bolt 17 will be free to pass over said chain. The grip dogs 18 and 19 are adapted to be alternately moved forward, one or more links at a time with each reciprocating movement of the free end of said lever 13, which lever is pivotally connected with the grip dogs 18 and 19 by the pivotal bolts 20 and 21. Thus it is obvious that as the free end of the lever 13 is moved toward the left, to the position shown in Fig. 1, motion will be communicated therefrom through the cable 6, clevis 14, link 15, bolts 16, 17 and 20, whereby the stump or other object to be pulled will be drawn toward the right, reference being had to Fig. 1. By the opposite movement of the free end of the lever 13, from the position shown, motion will be communicated through the grip dog 19 in the same direction to the object to be moved through said parts, 6, 14, 15, 16, 17 and 21, whereby with each forward and backward movement of the free end of the lever 13, the stump or other object to be pulled will be moved a distance corresponding with the forward movement of the grip dogs along the stationary cable 3.

It will be understood that each of the grip dogs 18 and 19 are provided with a circular aperture 22 and an elongated slot 23 for the reception of said cable 3 and that as the free end of said dogs are moved forwardly along said cable, such ends are thrown inwardly, whereby said dogs are free to pass over said cable without engaging the same. When, however, said dogs are moved rearwardly or in the opposite direction the narrow slotted ends of said apertures are drawn outwardly or away from said cable, whereby the slotted ends of said dogs are adapted to engage the links of said cable and are thereby prevented from moving past any of said links. As a means of throwing said dogs into and out of locking engagement with said cable their rear ends 24 are curved outwardly in opposite directions past the pivotal bolts 20 and 21, and said ends are connected with each other by the links 25 and 26 and bolts 27 and 28, and the opposite ends of said links 25 and 26 are pivotally connected together and to the link 15 by the bolt 29 operating in the elongated slots 30 and 31. Thus as the free end of the lever 13 is moved toward the right, the free end of the grip dog 18 will be thrown inwardly toward the cable 3, whereby said dog will pass freely over the links of said chain, while by the same movement of the lever 13 the free end of the grip dog 19 is thrown outwardly, whereby it is caused to engage the links of said chain and thereby cause the lever 13 and coöperating parts to be moved forwardly a distance corresponding with the number of the links over which such dogs have traversed in their forward movement. It will be understood that the slots 30 and 31 in said links 25 and 26 are such as to permit the free ends of said grip dogs to move toward and from the chain 3. Thus with each forward movement of the free end of the lever 13, motion will be communicated to the stump or other object to be pulled through the dog 19 and the connecting mechanism as hereinbefore described, while by the reverse or backward movement of the free end of said lever, motion will be communicated to the stump or other object to be pulled through the dog 18 and such connecting mechanism as described.

By the modified form shown in Fig. 4, the forward end of each of the grip dogs 40 is provided with a pair of eccentric cams 41, 41 which are secured thereto by the the pivotal bolts 42, 42 and said eccentric cams are adapted to be forced toward said cable by the resilient action of the springs 43, 43. The construction of such eccentric cams is such that they are automatically thrown apart and caused to slide freely over said cable as they move forward, while by the rearward movement of said dogs, said eccentric cams will be caused, by the friction of said cable coöperating with said spring, to turn in the opposite direction, whereby they are caused to firmly impinge said cable and thereby cause the stump to be uprooted and drawn from its original seat.

It will be understood that a much greater power is required when uprooting a stump than is required when drawing it from its seat after it has been loosened and for this reason I have provided a hook 44 for connecting the cable 6 with the cable 9 either direct or through pulleys and tackle blocks whereby the stump, after it has first been loosened through the use of the tackle block, as shown in Fig. 1, it may be moved forwardly as rapidly as the operating lever moves along the chain 3.

While my device is adapted to be used for pulling stumps, or moving automobiles, stones, or other objects, I have, for brevity of description, referred to the same as adapted to be used in connection with a movable object.

In view of the fact that some stumps require much greater power to extract them than others, I have provided means for increasing the leverage 13 over the grip dogs, and to accomplish this object, I have provided the lever 13 with a plurality of apertures 20', 21' for the reception of the bolts 20 and 21, and I have also provided apertures 27' and 28' for the reception of the pivotal bolts 27 and 28, whereby, it is obvious that by removing said bolts 20, 21, 27, and 28, and pivotally connecting said dogs through said bolts with the apertures 20', 21' 27' and 28', the power of said lever 13 over said grip dogs will be greatly increased. Attention is called to the fact that the overlapping ends of the slotted links 25 and 26 are slidably connected with the link 29 in rear of the rear ends of the grip dogs 24, 24, while the ends of grip dogs 24, 24, are both curved outwardly in opposite directions as stated, whereby the front ends of said grip dogs are caused to alternately pass freely over the link of the chain 3 until they get to the end of the forward movement, when they respectively move outwardly, whereby they are caused to engage the links of said cable.

Fig. 6 shows a modified form of the device for detachably connecting the operating lever 13 with the grip dogs 18 and 19, whereby said lever is adapted to be readily disengaged from said grip dogs and carried in compact form in an automobile, and whereby in case the automobile should become stalled, as they some times do in deep ruts or soft ground, the same may be readily moved by said device.

When using the device shown in Fig. 6, the lever 13 is temporarily inserted through the annular collars 13' and 14', which project from the sides of the bar 15', whereby said grip dogs may be operated in the manner described until the automobile is removed to a road having a solid foundation. When the automobile has been removed, the lever 13 may be again withdrawn from the collars 13' and 14' and placed in a suitable receptacle with the other grip mechanism in the automobile for future use.

Having thus described my invention, what I claim as new, and desire to secure by Letters Patent, is—

1. In a device of the described class, the combination of a cable adapted to be connected at one end with a movable object and at its opposite end with a stationary object, an operating lever connected with said cable, a pair of clutch members respectively pivotally connected near one of their ends with said operating lever upon the respective sides of said cable, and non-resilient means for causing said clutch members to engage the cable which is connected with the immovable object.

2. In a device of the described class, the combination of a tackle block and pulley, a cable connected at one end to a stationary object and at its opposite end with a movable object through said tackle block and pulley, an operating lever, a pair of clutch members respectively pivotally connected near one of their ends with said operating lever upon the respective sides of said cable, a pair of non-resilient links each connected at one of its ends with said clutch members and at its opposite end with said cable, said clutch members being adapted with each rearward movement of said lever to engage the cable connected with the immovable object.

3. In a device of the described class, the combination of a cable adapted to be connected at one end to a movable object and at its opposite end with a stationary object through a tackle block, a pair of clutch members pivotally connected near one of their ends to said operating lever and adapted to alternately engage at their opposite ends with said cable, a pair of links respectively connected at one of their ends with the rear end of said clutch members, the opposite end of said links being slidably connected together.

4. In a device of the described class, the combination of a cable adapted to be connected at one end to a stationary object and at its opposite end with a movable object, an operating lever, and a pair of clutch members pivotally connected near one of their ends to said operating lever, said clutch members being respectively curved outwardly in opposite direction past such pivotal connections, a pair of non-resilient links each link connected at one of its ends with said clutch members and at its opposite end with said cable, whereby said clutch members are adapted to alternately engage at their opposite ends with said cable.

5. In a device of the described class, the combination of a cable adapted to be connected at one end to a movable object and at its opposite end with a stationary object, a pair of clutch members respectively pivotally connected at one of their ends with said operating lever upon the respective sides of said cable, a pair of eccentric clamping members connected with each of said clutch members, means for causing said clamping members to firmly impinge opposing sides of said cable with each rearward movement of said clutch members, all substantially as and for the purpose specified.

6. In a device of the described class, the combination of a plurality of tackle blocks and pulleys, a cable connected at one end to a stationary object and at its opposite end through said tackle blocks and pulleys with a movable object, an operating lever, a pair of clutch members respectively pivotally connected near one of their ends with the said operating lever upon the respective side of said cable, and a hook, said hook being adapted to be temporarily connected at its respective ends with said cable.

In testimony whereof I affix my signature in the presence of two witnesses.

ALFRED J. KIRSTIN.

Witnesses:
RICHARD MOE,
A. W. BLOM.